June 4, 1929.  E. L. ENGELHARDT  1,716,216
TRANSMISSION
Filed Aug. 4, 1928   3 Sheets-Sheet 1

Inventor
E. L. Engelhardt
By Watson E. Coleman
Attorney

June 4, 1929.  E. L. ENGELHARDT  1,716,216
TRANSMISSION
Filed Aug. 4, 1928   3 Sheets-Sheet 3

Inventor
E.L. Engelhardt
By Watson E. Coleman
Attorney

Patented June 4, 1929.

1,716,216

UNITED STATES PATENT OFFICE.

ELMER L. ENGELHARDT, OF DENVER, COLORADO.

TRANSMISSION.

Application filed August 4, 1928. Serial No. 297,570.

This invention relates to transmissions and more particularly to a transmission which is especially intended for use in conjunction with the driving units of automobiles and may be conveniently employed in the operation of any gear driven machine.

An important object of the invention is to provide a transmission, wherein the gearing employed is continually in mesh and accordingly a smooth even shifting operation can be had from one selected speed to another.

A further object of the invention is to provide in a device of this character a construction such that the shifting lever may be operated by what is generally referred to as a straight-through movement of the shifting lever.

A still further object of the invention is to provide a device of this character, wherein the internal construction includes a series of duplicated parts, thereby enabling economical production of the transmission.

A still further object of the invention is to provide a construction such that a series of planetary trains may be arranged in series, of which series one of the trains drives through the remaining trains, so that the reduction of this train may be further reduced by the remaining trains.

A still further object of the invention is the production of a construction of the character just described of means whereby one or more of the trains may be cut out and a fixed drive provided through any desired number of the train series.

These and other objects I attain by the construction shown in the accompanying drawings, wherein for the purpose of illustration is shown a preferred embodiment of my invention and wherein:—

Figure 5 is a section on the line 5—5 of Figure 2.

Figure 3:
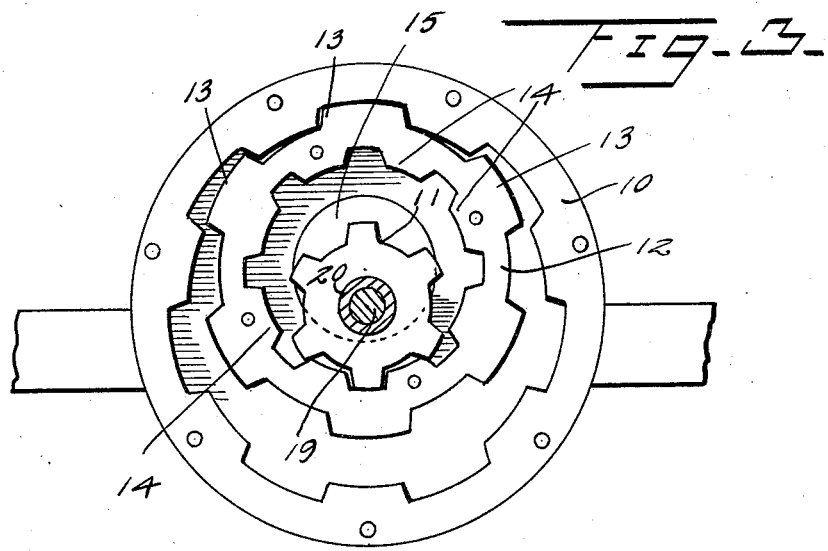
Figure 3 is a section on the line 3—3 of Figure 2.
Figure 4:
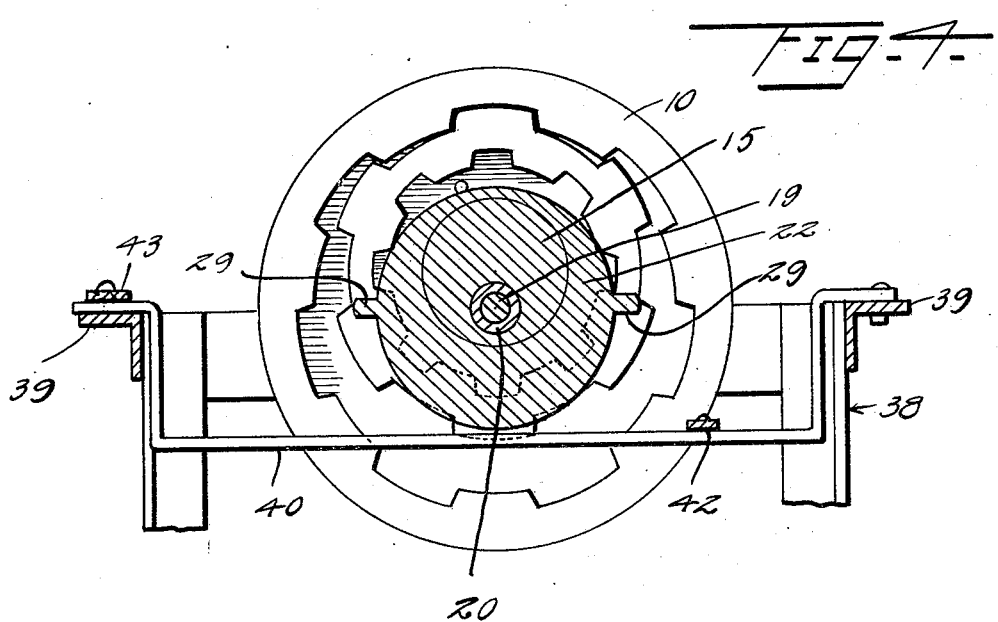
Figure 4 is a section on the line 4—4 of Figure 2.

Referring now to the drawings and more particularly to Figure 3 thereof, the planetary train employed as a basic unit in the present illustration comprises an internal orbit gear 10 and a sun gear 11 with which meshes a compound planet gear 12 having external teeth 13 for engagement with the internal planet gear 10 and internal teeth 14 for engagement with the sun gear 11. The sun and orbit gears are concentrically mounted while the planet gear is mounted upon an eccentric bearing 15, the eccentricity of which is such that the orbit gear simultaneously engages the sun and planet gears at diametrically opposed points.

It will be obvious to those familiar with the operation of planetary trains of this type that when the bearing 15 of the planet gear is stationary and the sun gear is driven, the orbit gear 10 will be driven at a materially reduced speed, and that if the bearing 15 of the orbit gear is driven at the same speed and in the same direction as the sun gear, there will be no displacement of the gears 10, 11 and 12 with relation to one another and the orbit gear will be driven at the same speed as the gear 11. If, however, the bearing 15 is driven in the opposite direction to the sun gear, a much reduced speed of the orbit gear in the opposite direction to the rotation of the sun gear will result.

Figure 1:
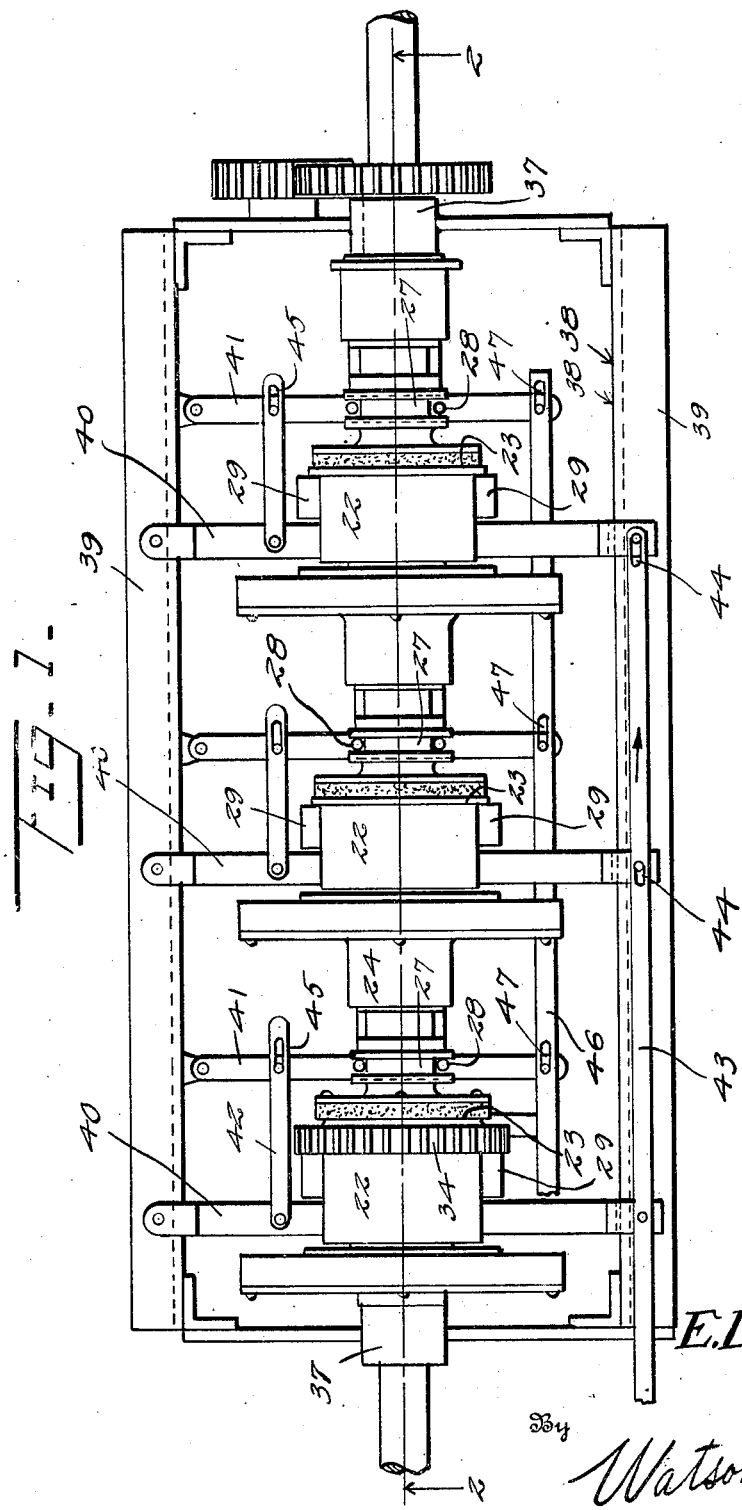
Figure 1 is a plan view showing a transmission constructed in accordance with my invention.
Figure 2:
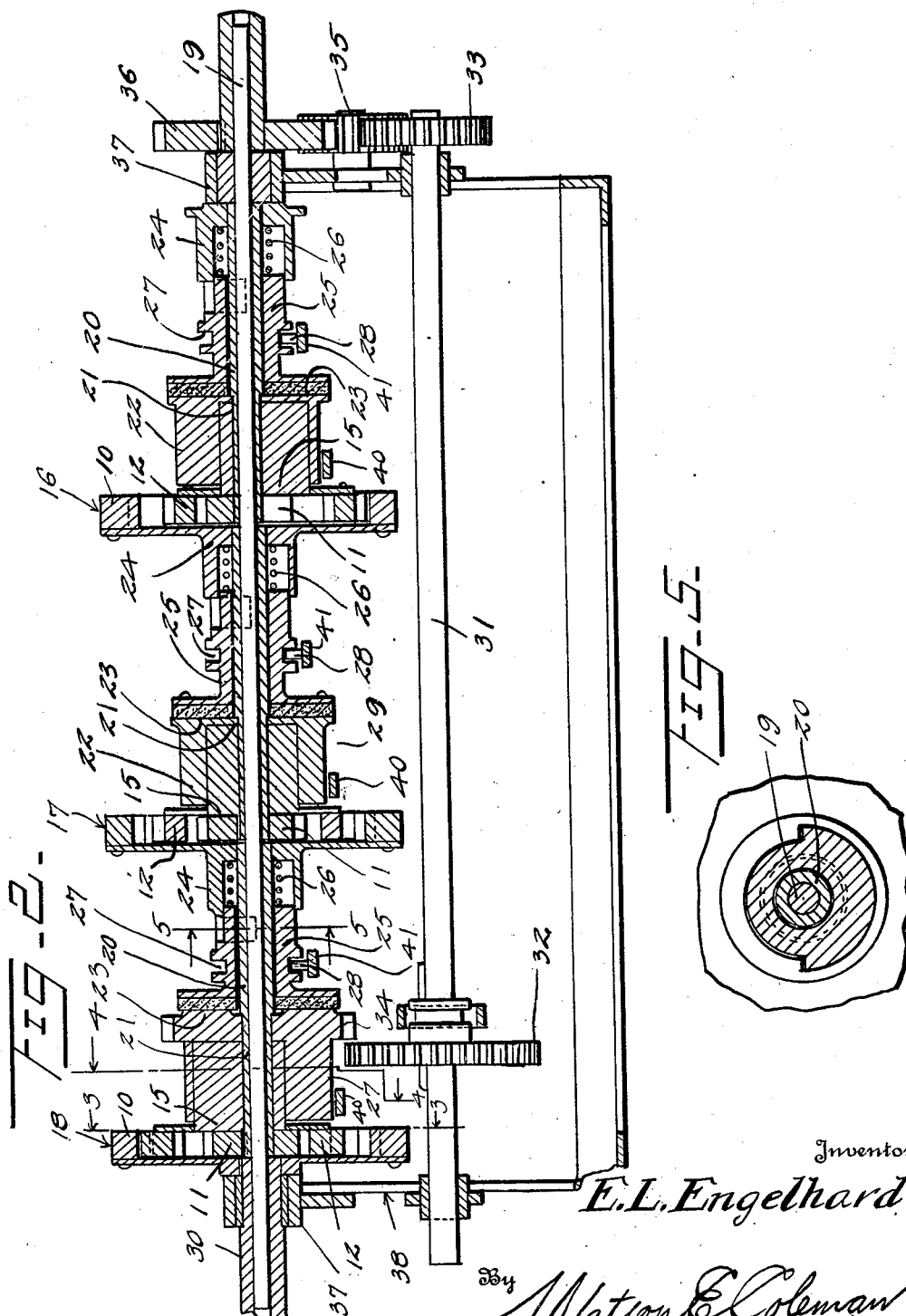
Figure 2 is a longitudinal sectional view therethrough.

In accordance with my invention, planetary gearing of this type is arranged in duplicate series upon a shaft, as clearly shown in Figures 1 and 2, in which the trains are generally designated at 16, 17 and 18. The shaft, indicated at 19, is connected to a drive but has no permanent driving connection to any of the elements of the several trains except the initial train 16, as will hereinafter more fully appear. Each train has its sun gear 11 permanently secured to one end of a tubular shaft 20, which is reduced intermediate its ends, as indicated at 21, the gear being secured to the smaller end of the shaft. Mounted upon the shaft between the shoulder formed by the reduction and the sun gear is a body 22 externally concentric with the shaft and having at the end thereof adjacent the sun gear an eccentric projection, forming the bearing 15. The opposite end of this body is formed as a clutch face 23. Upon the opposite end of the tubular shaft is secured a hollow hub 24 housing and providing a spline connection for the second element 25 of the clutch.

This element of the clutch is spring-urged toward the clutch base 23 by a spring 26 housed in the hollow hub and is suitably grooved or otherwise adapted, as at 27, for engagement with a shifting element, at present shown as a fork 28. The exterior of the body 22, which may hereinafter be referred to as the stationary clutch element, is provided with protuberances 29 adjacent one end thereof, the purpose of which will presently appear.

The orbit gears 10 of the trains 16 and 17 are secured to the hubs 24 of the trains 17 and 18 respectively, while the gear 10 of the train 18 is secured to a sleeve 30 which is connected to the element to be driven. The shaft 20 which is secured to the sun gear of the train 16 is secured against rotation with relation to the shaft 19, so that this sun gear and element 25 of the clutch are always rotating at the same speed as the shaft 19. A jack shaft 31 is provided having the gears 32 and 33 adapted to mesh with a gear 34 formed upon the clutch element 22 associated with the gear train 18 and with an idler 35 driven by a gear 36 secured to the shaft 19 respectively.

In the present showing, which is semi-diagrammatic in its nature, the shaft 19 and sleeve 30 are shown as mounted in bearings 37 carried by a frame 38. One of the side members 39 of this frame has pivoted thereto levers 40 extending transversely of the frame and in close proximity to the face of the clutch elements 22. These levers normally lie out of the path of the protuberances 29 but may be shifted into the path thereof to hold the clutch elements 22 against rotation.

The side member 39 has further pivoted thereto levers 41 by the outer ends of which the forks 28 are carried and the lever 41 of each clutch element 25 is connected to the lever 40 of the associated clutch element 22 by a link 42. The free ends of the levers 40 are connected to a common operating rod 43, the lever 40 associated with the train 18 being directly pivoted to this operating lever while the levers of the remaining trains are connected thereto by pivots engaging in slots 44 in the operating rod. These slots are of such character that as the operating rod is moved in the direction of the arrow of Figure 1, the clutch of the train 18 is disengaged and the element 22 held against rotation. Then similar operations successively take place in the trains 17 and 16.

Assuming the parts to be in the position shown in Figure 2 and the shaft 19 to be driven, since all of the clutch elements 25 are engaged with the elements 22, the eccentric bearings of the planet gears are all rotating at the same speed as the sun gears and a straight-through drive of the same speed as the speed of the shaft 19 is transmitted to the driven sleeve 30. If the rod 43 is now shifted in the direction of the arrow until the clutch elements of the train 18 are disengaged, the sun gear of this train, while driven at the same speed as the shaft 19, is acting through planetary movement of the planet gear as the reduction afforded by the train 18 is transmitted to the sleeve 30. Upon a further shifting movement, the clutch elements of the train 17 are disconnected, with the result that the reduction afforded by the train 17 is transmitted to and forms a drive for a sun gear of the train 18, so that the reductions afforded by these gears are compounded and a still further reduced speed of the sleeve 30 results.

An extreme movement which likewise disengages the clutch elements of the train 16 adds the reduction of this gear, so that the slowest transmitted speed of the illustrated structure is provided.

In order to permit reverse operation, the link connections 42 have a pin and slot engagement in their connection with the clutch operating levers 41, as indicated at 45. The gear 32 is splined upon the shaft 31, so that it may be shifted thereon to engage with the gear 34 and a longitudinally extending shifting rod 46 is provided for shifting this gear. This shifting rod 46 has a pin and slot engagement with the levers 41, as indicated at 47, such that when the levers 41 are operated through the levers 40 and links 42, no operation of the rod 46 takes place. When the rod 46 is operated to engage the gear 32, however, the levers 41 are caused to shift, disengaging the clutch sections of each of the trains. When the rod 46 is shifted to disengage the gear 32, the springs of these clutches will permit the clutches to return to their normal positions. Thus, an operation of the clutches may be effected without causing an operation of the levers 40 and accordingly without checking rotation of the eccentric bearings 15. While the gear 34 has been shown as disposed upon the train 18, with the result that the speed of operation in reverse will be that transmitted by the gears 36, 35, 33, 32 and 34, it will be quite obvious that the gear 34 could be associated with the train 17, thereby making use of the reduction factor of the train 18.

Since the construction hereinbefore set forth is obviously capable of a certain range of change and modification without materially departing from the spirit of the invention, I do not limit myself to such specific structure except as hereinafter claimed.

I claim—

1. In transmission mechanism, a plurality of planetary trains arranged in series and each comprising an externally toothed sun gear, a surrounding internally toothed orbit gear, and a connecting planet gear internally and externally toothed for coaction with said sun and orbit gears, bearings for the planet gears eccentric to their associated sun gears, a clutch for connecting the bearing of the planet gear of the first train to a drive, clutches for connecting the bearings of the planet gears of the remaining trains to the orbit gear of the succeeding train, means for holding said bearings against rotation when the clutches thereof are disengaged, and a common operating means for successively disengaging said clutches and operating after the last named means.

2. In transmission mechanism, a plurality of planetary trains arranged in series and each comprising an externally toothed sun gear, a surrounding internally toothed orbit gear and a connecting planet gear internally and externally toothed for coaction with said sun and orbit gears, bearings for the planet gears eccentric to their associated sun gears, a clutch for connecting the bearing of the planet gear of the first train to a drive, clutches for connecting the bearings of the planet gears of the remaining trains to the orbit gear of the succeeding train, and means for positively rotating one of said bearings in a direction reverse to the direction of operation of its associated sun gear.

3. In transmission mechanism, a plurality of planetary trains arranged in series and each comprising an externally toothed sun gear, a surrounding internally toothed orbit gear and a connecting planet gear internally and externally toothed for coaction with said sun and orbit gears, bearings for the planet gears eccentric to their associated sun gears, a clutch for connecting the bearing of the planet gear of the first train to a drive, clutches for connecting the bearings of the planet gears of the remaining trains to the orbit gear of the succeeding train, means for successively operating the clutches of the train, means for holding the bearings against rotation when the clutches thereof are disengaged, means for reversely rotating the bearing of one of said trains and control means therefor, operation of which simultaneously disengages the clutches of all of the trains without operation of said means for holding the bearings against rotation.

4. In transmission mechanism, a plurality of planetary trains arranged in series and each comprising an externally toothed sun gear, a surround internally toothed orbit gear, and a connecting planet gear internally and externally toothed for coaction with said sun and orbit gears, bearings for the planet gears eccentric to their associated sun gears, a clutch for connecting the bearing of the planet gear of the first train to a drive, clutches for connecting the bearings of the planet gears of the remaining trains to the orbit gear of the succeeding train, means for holding said bearings against rotation when the clutches thereof are disengaged, a common operating means for said clutches successively engaging or disengaging said clutches, means for reversely rotating one of said bearings and control means therefor, and connections between the clutches and said control means whereby the clutches are disengaged after said operating means is shifted to cause reverse rotation of said bearing, the connection between the clutches and said control means permititng operation of the clutches by said control means without operation of said means for holding the bearings against rotation.

5. In transmission mechanism, a plurality of planetary trains arranged in series and each comprising an externally toothed sun gear, a surrounding internally toothed orbit gear and a connecting planet gear internally and externally toothed for coaction with said sun and orbit gears, bearings for the planet gears eccentric to their associated sun gears, a clutch for connecting the bearing of the planet gear of the first train to a drive, clutches for connecting the bearings of the planet gears of the remaining trains to the orbit gear of the succeeding train, reverse gearing for connecting the drive to the bearing of the remaining train, and means operated by engagement of said reverse gearing disconnecting the clutches of said trains.

In testimony whereof I hereunto affix my signature.

ELMER L. ENGELHARDT.